(12) United States Patent
Fasola

(10) Patent No.: US 7,472,510 B1
(45) Date of Patent: Jan. 6, 2009

(54) FISHING ROD HOLDER

(76) Inventor: Joseph M. Fasola, 347 Maple Leaf Cir., Slidell, LA (US) 70458

( * ) Notice: Subject to any disclaimer, the term of this patent is extended or adjusted under 35 U.S.C. 154(b) by 996 days.

(21) Appl. No.: 10/636,891

(22) Filed: Aug. 7, 2003

(51) Int. Cl.
*A01K 97/10* (2006.01)
(52) U.S. Cl. ....................................... 43/21.2
(58) Field of Classification Search ............. 43/21.2; 211/70.8; 248/513, 512
See application file for complete search history.

(56) References Cited

U.S. PATENT DOCUMENTS

| | | | | | |
|---|---|---|---|---|---|
| 561,826 | A | * | 6/1896 | Smith | 211/13.1 |
| 1,263,323 | A | * | 4/1918 | Kaempf | 248/513 |
| 2,055,842 | A | | 9/1936 | Haislip | |
| 2,721,680 | A | * | 10/1955 | Steckman | 224/275 |
| 3,659,369 | A | * | 5/1972 | Hermanson | 43/21.2 |
| 4,311,262 | A | * | 1/1982 | Morin | 294/141 |
| 4,485,579 | A | * | 12/1984 | Hawie | 43/21.2 |
| 4,865,287 | A | * | 9/1989 | Stoudt | 248/513 |
| 4,871,099 | A | | 10/1989 | Bogar, Jr. | |
| 5,435,473 | A | | 7/1995 | Larkum | |
| 5,715,952 | A | | 2/1998 | Chichetti | |
| 5,813,164 | A | * | 9/1998 | Liberto | 43/21.2 |
| 5,815,976 | A | * | 10/1998 | Jernigan et al. | 43/21.2 |
| 6,250,480 | B1 | * | 6/2001 | McGuinness | 211/70.8 |
| 6,360,902 | B1 | * | 3/2002 | Searles | 211/70.8 |

* cited by examiner

*Primary Examiner*—Kurt Rowan
(74) *Attorney, Agent, or Firm*—Kenneth L Tolar

(57) ABSTRACT

A fishing rod holder for mounting within a pickup truck bed includes a housing having a top surface with a pair of side walls depending therefrom. Also depending from the top surface are a vertical front wall and an oblique, inwardly extending rear wall. Received within the housing and accessible from the top surface thereof are a plurality of obliquely extending tubular rod holders. A mounting lip is positioned adjacent a front edge of the top surface for fastening the housing to a truck bed wall or toolbox.

6 Claims, 2 Drawing Sheets

FISHING ROD HOLDER

BACKGROUND OF THE INVENTION

The present invention relates to a fishing rod holder designed particularly for mounting within a pickup truck bed to conveniently transport a plurality of fishing rods.

DESCRIPTION OF THE PRIOR ART

Fishermen often transport numerous fishing rods in a vehicle. However, storing rods in a vehicle presents numerous problems. Each rod usually includes fishing line with lures or hooks attached thereto that can easily become entangled when the rods are contiguously stored in a trunk or other storage compartment. Furthermore, the rods are jostled in a moving vehicle often resulting in significant damage thereto.

Various fishing rod holders have been heretofore designed to assist fisherman in transporting multiple fishing rods. However, most of these devices are designed to be attached to the vehicle bumper, i.e., typically the front bumper. Such conventional devices have several disadvantages. They typically employ a complicated, cumbersome attachment means for fastening to the bumper. Furthermore, each rod is typically secured in an upright, vertical position creating substantial wind drag as well as jolting, bending and/or breakage of the rods.

For example, U.S. Pat. No. 5,715,952 issued to Chichetti discloses a fishing rod holding device including a pair of horizontal, spaced supporting members having a plurality of vertical, spaced tubular fishing rod holders secured thereto. Suction cups are positioned on the back surface of the supporting members to attach the device to a support surface.

U.S. Pat. No. 5,435,473 issued to Larkum discloses a fishing rod holder including vertical tubes secured to a horizontal support surface. The upper end of each holder includes a vertical slot for accommodating a fishing reel post. A restraining bar is received within apertures on the holders to prevent removal of the fishing rods.

U.S. Pat. No. 4,871,099 issued to Bogar, Jr. discloses a fishing rod holder including a plurality of vertically extending tubular holders connected to a plurality of horizontally spaced supports. Each holder includes tapered slots for receiving a reel.

U.S. Pat. No. 5,815,976 issued to Jernigan, et al. discloses a fishing rod holder including a connector plate that attaches to a vehicle bumper. An arm having a plurality of sleeve holders is coupled with the plate.

U.S. Pat. No. 2,055,842 issued to Haislip discloses a fishing rod holder including a clamp attachable to a boat having a cup pivotally secured thereto for receiving and supporting a fishing rod.

U.S. Pat. No. 5,033,233 issued to Minter discloses a fishing rod holder including a bracket attached to the rear bumper of a vehicle. One or more tubes are pivotally mounted on the frame, each of which can receive a fishing rod.

As indicated above, a myriad of fishing rod holders, some of which are attachable to vehicles, exist in the prior art. However, none are uniquely configured according to the present invention to allow for quick attachment to a pickup truck bed wall or truck bed toolbox as is the present invention. Furthermore, the fishing rod holder according to the present invention suspends each rod at an angle relative to a vertical plane to firmly anchor the rods and to minimize bending or breakage thereof as the vehicle is moving.

SUMMARY OF THE INVENTION

The present invention relates to a fishing rod holder designed for a vehicle, particularly a pickup truck. The device comprises a hollow housing having a horizontal top surface, an open bottom, two opposing vertical side walls depending from the top surface and a vertical front wall therebetween. Obliquely depending from a rear edge of the top surface is a rear wall. The rear wall extends inwardly at a predetermined angle so that the housing assumes a substantially triangular cross-sectional configuration.

On the top surface immediately adjacent the front edge thereof is an elongated lip having a substantially inverted, U-shaped cross-sectional configuration for encompassing a support surface such as the upper edge of a truck bed front wall or a bed mounted toolbox.

On the top surface of the housing are a plurality of substantially aligned apertures. Received within each aperture is an elongated tubular rod holder, each for receiving the lower end of the fishing rod. Each rod holder is substantially parallel to the housing rear wall so as to suspend each rod at an angle relative to a vertical plane.

It is therefore an object of the present invention to provide a fishing rod holder that can be quickly and conveniently secured within the bed of a pickup truck.

It is another object of the present invention to provide a fishing rod holder that allows fishermen to conveniently transport multiple fishing rods.

It is yet another object of the present invention to provide a fishing rod holder that minimizes damage and bending of fishing rods normally associated with conventional vehicle mounted rod holders.

Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
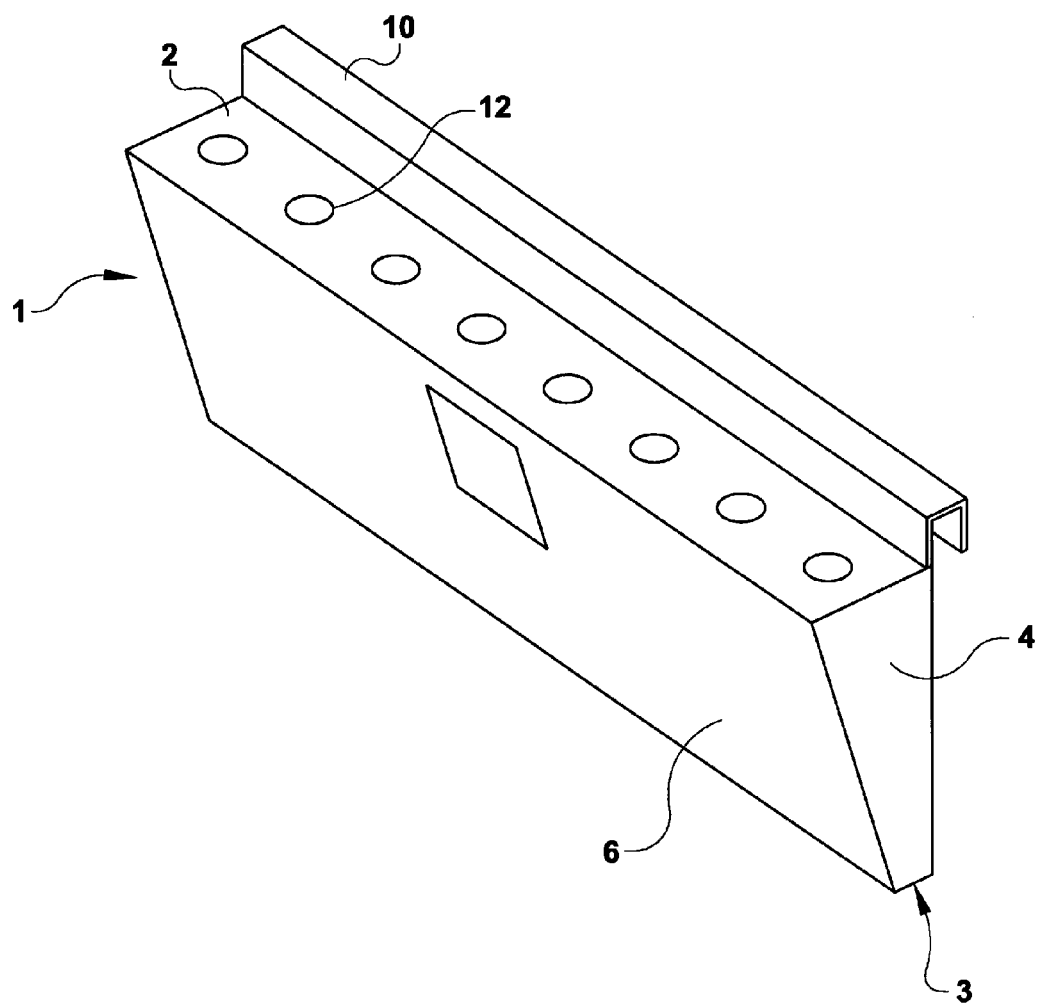
FIG. 1 is a perspective view of the rod holder.
Figure 2:
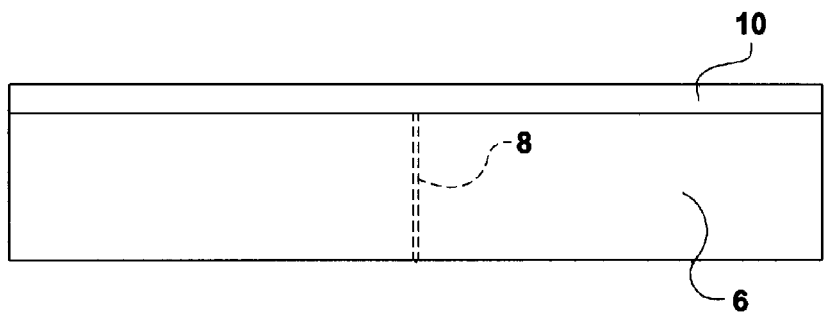
FIG. 2 is a front view of the rod holder.
Figure 3:
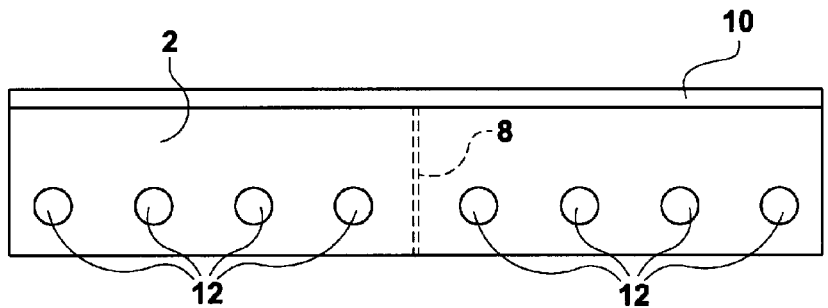
FIG. 3 is a top view of the rod holder.
Figure 4:
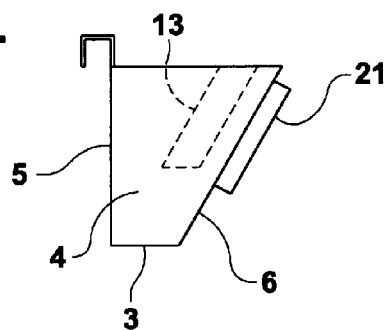
FIG. 4 is a side view of the rod holder.
Figure 5:
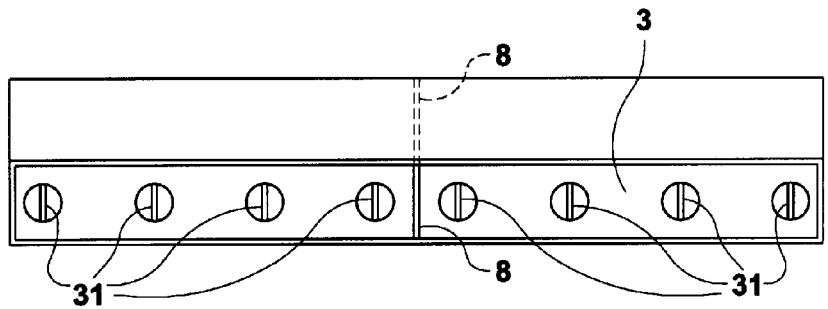
FIG. 5 is a bottom view of the rod holder.

The present invention relates to a fishing rod holder designed to mount to a vehicle, particularly a pickup truck. The device comprises a hollow housing 1 having a horizontal top surface 2, an open bottom 3, two opposing vertical side walls 4 depending from the top surface and a vertical front wall 5 therebetween. Obliquely depending from a rear edge of the top surface is a rear wall 6. The rear wall extends inwardly at a predetermined angle so that the housing has a substantially triangular cross-sectional configuration. Centrally disposed within the housing is a substantially triangular reinforcement plate 8 having a rear edge, a front edge and a top edge each peripherally fastened to the rear wall, the front wall and the top surface, respectively, to enhance the structural integrity of the housing.

An elongated lip 10 extends along substantially the entire length of the front edge of the housing top surface. The lip has a substantially inverted U-shaped cross-sectional configuration for engaging and encompassing a support surface such as the upper edge of a truck bed front wall or a bed mounted toolbox.

On the top surface of the housing are a plurality of substantially aligned apertures 12. Received within each aperture is an elongated tubular rod holder 13 that extends into the housing interior, each for receiving the lower end of a fishing rod. Each rod holder is substantially parallel to the housing rear wall so as to suspend each rod at an angle relative to a vertical plane. A plurality of tubular rod holders 21 may also be fastened to the exterior surface of the rear wall for angularly suspending additional rods, if desired. Each rod holder preferably includes a substantially open lower end with a transverse strip 31 that is received within an indention found on the lower end of most fishing rods to anchor the rod within the holder.

As is now readily apparent, the above described device can be quickly and conveniently mounted within a pick up truck bed to conveniently transport a plurality of fishing rods. Furthermore, the angular orientation of the rod holders minimizes bumping, bending and breakage of the rods as the vehicle is moving. The unique design of the housing affords several advantages over more conventional designs; specifically, the inwardly extending rear wall significantly reduces the materials necessary to allow the housing to accommodate the angularly extending rod holders. Additionally, the housing configuration occupies less storage space in the truck bed than would a square or box-shaped housing. Because the top mounted rod holders allow water to seep into the housing interior, the bottom is open so that the water will immediately drain to the truck bed.

The present invention is not to be limited to the exact details of construction and enumeration of parts described above. Additionally, the size, shape and materials of construction of the various components forming the present invention may be varied to suit a particular application. Though the device that has been shown and described as primarily designed for mounting to the upper edge of a truck bed wall, the device can be easily fastened to other suitable support surfaces.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A fishing rod holder comprising:
   a substantially hollow housing including a top surface having a front edge; said housing further including a pair of opposing sidewalls, a front wall and a rear wall depending from said top surface; said rear wall inwardly and obliquely depending from said top surface such that said housing has a substantially triangular cross-sectional configuration;
   an elongated, substantially U-shaped lip secured to the top surface of said housing and longitudinally positioned along the front edge thereof for suspending said housing from a support surface;
   a plurality of tubular fishing rod holders received within said housing and depending from the top surface thereof, said rod holders being parallel to said rear wall to suspend a rod at a predetermined angle relative to a vertical plane.

2. The fishing rod holder according to claim 1 further comprising a plurality of rod holders secured to the rear wall of said housing for accommodating additional fishing rods.

3. The fishing rod holder according to claim 1 wherein said housing further includes an open bottom allowing moisture accumulation within the housing to drain therefrom.

4. The fishing rod holder according to claim 1 wherein said housing further includes a reinforcement plate disposed therein, said plate fastened to the rear wall, the top surface and the front wall to enhance the structural integrity of the housing.

5. The fishing rod holder according to claim 1 wherein said front wall vertically depends from said top surface.

6. The fishing rod holder according to claim 5 wherein said sidewalls vertically depend from said top surface.

* * * * *